US011352970B2

(12) United States Patent
Mitani

(10) Patent No.: US 11,352,970 B2
(45) Date of Patent: Jun. 7, 2022

(54) CONTROL DEVICE OF INTERNAL COMBUSTION ENGINE

(71) Applicant: TOYOTA JIDOSHA KABUSHIKI KAISHA, Aichi-ken (JP)

(72) Inventor: Shinichi Mitani, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/340,104

(22) Filed: Jun. 7, 2021

(65) Prior Publication Data

US 2021/0381455 A1 Dec. 9, 2021

(30) Foreign Application Priority Data

Jun. 9, 2020 (JP) .............................. JP2020-100230

(51) Int. Cl.
*F02D 41/06* (2006.01)
*F02D 41/38* (2006.01)
*F02P 5/15* (2006.01)

(52) U.S. Cl.
CPC ......... *F02D 41/064* (2013.01); *F02D 41/068* (2013.01); *F02D 41/38* (2013.01); *F02P 5/1506* (2013.01)

(58) Field of Classification Search
CPC ..... F02D 41/064; F02D 41/068; F02P 5/1506
See application file for complete search history.

(56) References Cited

U.S. PATENT DOCUMENTS

| 2005/0016500 | A1* | 1/2005 | Borg ..................... F02P 5/1506 123/406.47 |
| 2016/0356228 | A1* | 12/2016 | Liu ........................ F02P 5/1506 |
| 2018/0128196 | A1* | 5/2018 | Gottlieb .............. F02D 41/3023 |

FOREIGN PATENT DOCUMENTS

JP 2006291971 A 10/2006

* cited by examiner

*Primary Examiner* — Sizo B Vilakazi
(74) *Attorney, Agent, or Firm* — Hauptman Ham, LLP

(57) ABSTRACT

An internal combustion engine includes a fuel injection valve that injects fuel into a combustion chamber and an ignition plug that ignites an air-fuel mixture in the combustion chamber. A control device of the internal combustion engine includes an electronic control unit configured to, when a cold-starting of the internal combustion engine is started, execute a plurality of fuel injections into each cylinder in one cycle, after the cold-starting of the internal combustion engine is started, retard a timing of an ignition by the ignition plug in each cylinder, and after the timing of the ignition by the ignition plug is retarded, decrease the number of fuel injections into each cylinder in one cycle according to the retardation of the ignition timing by the ignition plug.

5 Claims, 8 Drawing Sheets

CONTROL DEVICE OF INTERNAL COMBUSTION ENGINE

CROSS-REFERENCE TO RELATED APPLICATION

This application claims priority to Japanese Patent Application No. 2020-100230 filed on Jun. 9, 2020, incorporated herein by reference in its entirety.

BACKGROUND

1. Technical Field

The present disclosure relates to a control device of an internal combustion engine.

2. Description of Related Art

A split injection in which a plurality of fuel injections into a combustion chamber of each cylinder is executed per cycle is well-known (see, for example, Japanese Unexamined Patent Application Publication No. 2006-291971 (JP 2006-291971 A)). In particular, in JP 2006-291971 A, it has been proposed to increase the number of fuel injections in a split injection when heavy fuel having poor atomization characteristics is used as compared with when standard fuel is used.

SUMMARY

When the internal combustion engine is cold-started, it is also conceivable to execute the split injection so as to promote atomization of injected fuel. Meanwhile, when the internal combustion engine is cold-started, it is necessary to warm up an exhaust gas control catalyst of the internal combustion engine at an early stage in order to reduce exhaust emissions. As described above, in order to warm up the exhaust gas control catalyst of the internal combustion engine at an early stage, it is conceivable to set a timing of an ignition by an ignition plug to a timing on the retarded side.

However, when the ignition timing is set to the timing on the retarded side in a state where the split injection is executed, stability of combustion of an air-fuel mixture may deteriorate and vibration in the internal combustion engine may increase.

The present disclosure provides a control device of an internal combustion engine that can restrict deterioration of stability of combustion of an air-fuel mixture even when a split injection and retardation of an ignition timing are executed when the internal combustion engine is cold-started.

The gist of the present disclosure will be described below.

A control device of an internal combustion engine according to an aspect of the present disclosure includes a fuel injection valve that injects fuel into a combustion chamber, and an ignition plug that ignites an air-fuel mixture in the combustion chamber. The control device includes an electronic control unit configured to, when a cold-starting of the internal combustion engine is started, execute a plurality of fuel injections into each cylinder in one cycle, after the cold-starting of the internal combustion engine is started, retard a timing of an ignition by the ignition plug in each cylinder, and after the timing of the ignition by the ignition plug is retarded, decrease the number of fuel injections into each cylinder in one cycle.

In the above aspect, the electronic control unit may retard the timing of the ignition in each cylinder in a step-by-step manner.

In the above aspect, the electronic control unit may decrease the number of fuel injections into each cylinder in one cycle after the retardation of the timing of the ignition in each cylinder is all completed.

In the above aspect, the electronic control unit may decrease the number of fuel injections into each cylinder in one cycle in a step-by-step manner in response to the retardation of the timing of the ignition in each cylinder in the step-by-step manner.

With the above aspect of the present disclosure, a control device of an internal combustion engine that can restrict deterioration of stability of combustion of an air-fuel mixture even when a split injection and retardation of an ignition timing are executed when the internal combustion engine is cold-started is provided.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, embodiments will be described in detail with reference to drawings. In the following description, same components are denoted by the same reference signs.

First Embodiment

Configuration of Internal Combustion Engine

Figure 1:
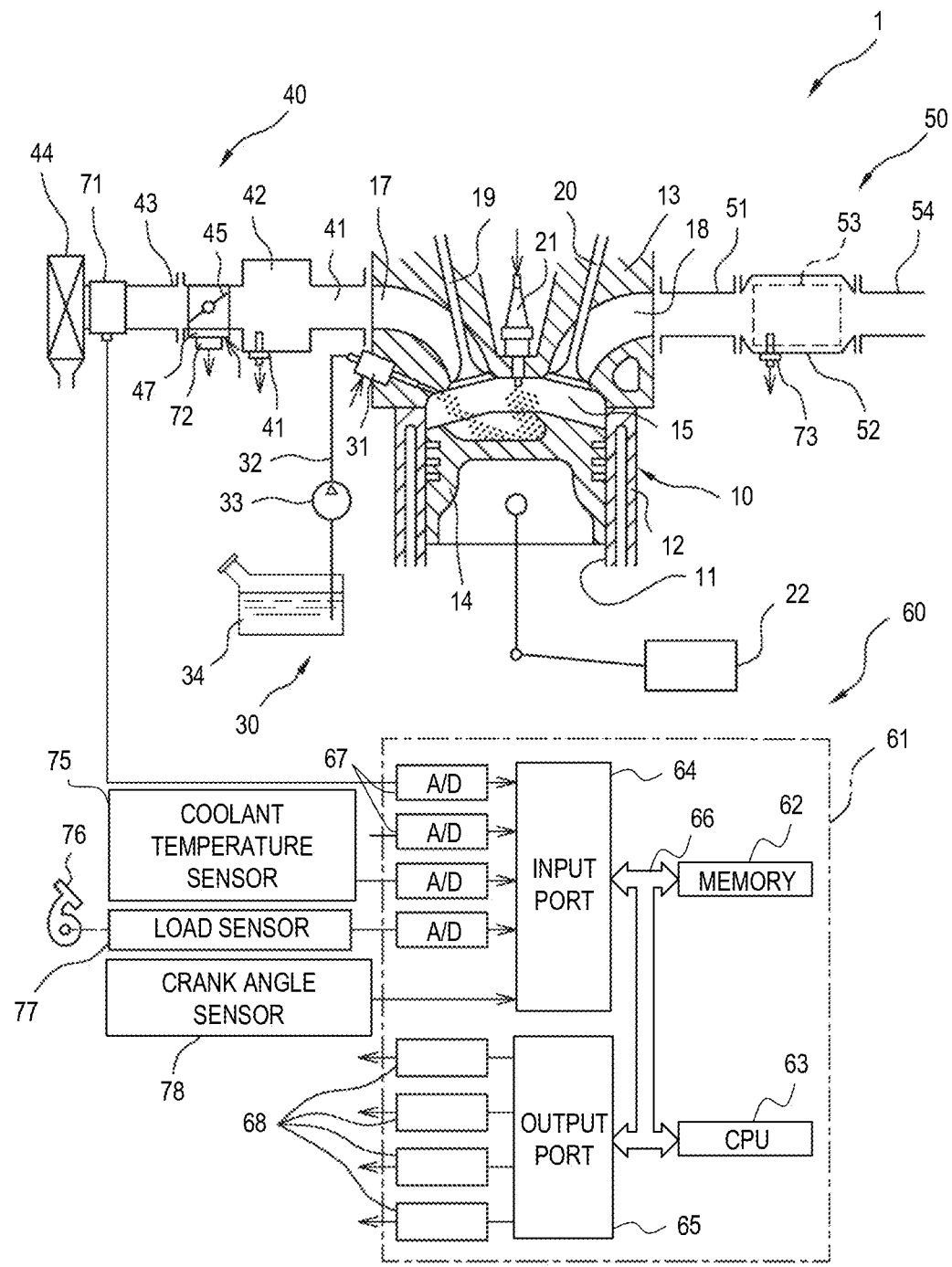
FIG. 1 is a diagram schematically illustrating an internal combustion engine in which a control device according to one embodiment is used.

First, an internal combustion engine in which a control device according to one embodiment is used will be described with reference to FIG. 1. The internal combustion engine of the present embodiment is used for driving a vehicle. FIG. 1 is a diagram schematically illustrating an internal combustion engine in which the control device according to one embodiment is used. As illustrated in FIG. 1, an internal combustion engine 1 includes an engine body 10, a fuel supply device 30, an intake-air system 40, an exhaust system 50, and a control device 60.

The engine body 10 includes a cylinder block 12 in which a cylinder 11 is formed, and a cylinder head 13 fixed on the cylinder block 12. In each cylinder 11, a piston 14 that moves in a reciprocating motion therein is arranged. In the cylinder 11 between the piston 14 and the cylinder head 13, a combustion chamber 15 that combusts an air-fuel mixture is formed.

In the cylinder head 13, an intake-air port 17 and an exhaust port 18 are formed. The intake-air port 17 and the exhaust port 18 communicate with the combustion chamber 15 of each cylinder 11. Between the combustion chamber 15 and the intake-air port 17, an intake-air valve 19 that opens and closes the intake-air port 17 is arranged. Similarly, between the combustion chamber 15 and the exhaust port 18, an exhaust valve 20 that opens and closes the exhaust port 18 is arranged.

Further, in the cylinder head 13, at the center of an inner wall surface that defines each cylinder 11, an ignition plug 21 is arranged. The ignition plug 21 is configured to generate sparks in response to an ignition signal and ignite the air-fuel mixture in the combustion chamber 15.

Further, the engine body 10 is provided with a starter motor 22 that drives the stopped internal combustion engine 1. The starter motor 22 rotates a crankshaft connected to the piston 14 via a connecting rod. When the internal combustion engine 1 is used in a hybrid vehicle, instead of the starter motor 22, a motor generator or the like, which is also used for driving a vehicle, may be used for driving the stopped internal combustion engine 1.

The fuel supply device 30 includes a fuel injection valve 31, a fuel supply pipe 32, a fuel pump 33, and a fuel tank 34. The fuel injection valve 31 is arranged in the cylinder head 13 so as to directly inject fuel into the combustion chamber 15 of each cylinder 11.

The fuel injection valve 31 is connected to the fuel tank 34 via the fuel supply pipe 32. The fuel pump 33 that pumps fuel in the fuel tank 34 is arranged in the fuel supply pipe 32. The fuel pumped by the fuel pump 33 is supplied to the fuel injection valve 31 via the fuel supply pipe 32, and is directly injected from the fuel injection valve 31 into the combustion chamber 15 as the fuel injection valve 31 is opened.

The intake-air system 40 includes an intake-air branch pipe 41, a surge tank 42, an intake-air pipe 43, an air cleaner 44, and a throttle valve 45. The intake-air port 17 of each cylinder 11 communicates with the surge tank 42 via the corresponding intake-air branch pipe 41, and the surge tank 42 communicates with the air cleaner 44 via the intake-air pipe 43. The throttle valve 45 is arranged in the intake-air pipe 43 and is rotated by a throttle valve drive actuator 47 so as to change a size of an opening area of an intake-air passage. The intake-air port 17, the intake-air branch pipe 41, the surge tank 42, and the intake-air pipe 43 form the intake-air passage through which intake gas is supplied into the combustion chamber 15.

The exhaust system 50 includes an exhaust manifold 51, an exhaust gas control catalyst 53 contained in a casing 52, and an exhaust pipe 54. The exhaust port 18 of each cylinder 11 communicates with the exhaust manifold 51, and the exhaust manifold 51 communicates with the casing 52 that contains the exhaust gas control catalyst 53. The casing 52 communicates with the exhaust pipe 54.

The exhaust gas control catalyst 53 is a device that removes uncombusted HC, CO, and $NO_x$ from the exhaust gas. Examples of the exhaust gas control catalyst 53 include a three-way catalyst in which a noble metal catalyst, such as platinum, is supported on a carrier formed by cordierite. The exhaust gas control catalyst 53 may be formed as a particulate filter having a function of collecting particulate matters as long as it has a noble metal catalyst and may remove uncombusted HC, CO, and $NO_x$ from the exhaust gas. The exhaust port 18, the exhaust manifold 51, the casing 52, and the exhaust pipe 54 form an exhaust gas passage through which the exhaust gas is discharged from the combustion chamber 15.

The control device 60 includes an electronic control unit (ECU) 61 and various sensors. The ECU 61 includes a memory 62, a CPU (a microprocessor) 63, an input port 64, and an output port 65, which are connected to one another via bidirectional buses 66.

The control device 60 includes an air flow meter 71, a throttle opening degree sensor 72, a catalyst temperature sensor 73, a coolant temperature sensor 75, a load sensor 77, and a crank angle sensor 78. The air flow meter 71 is arranged in the intake-air pipe 43 and detects an air flow rate of the air flowing in the intake-air pipe 43. The throttle opening degree sensor 72 is provided in the throttle valve 45 and detects an opening degree of the throttle valve 45. In addition, the catalyst temperature sensor 73 is provided in the exhaust gas control catalyst 53 and detects a temperature of the exhaust gas control catalyst 53. In addition, the coolant temperature sensor 75 is provided in the engine body 10 and detects a temperature of a coolant used for cooling the internal combustion engine 1. Outputs of the air flow meter 71, the throttle opening degree sensor 72, the catalyst temperature sensor 73, and the coolant temperature sensor 75 are input to the input port 64 via corresponding AD converters 67.

Further, the load sensor 77 is connected to an accelerator pedal 76 and generates an output voltage proportional to a depression amount of the accelerator pedal 76. The output voltage of the load sensor 77 is input to the input port 64 as a signal indicating an engine load via the corresponding AD converter 67. The crank angle sensor 78 generates an output pulse every time the crankshaft rotates by, for example, 10 degrees, and the output pulse is input to the input port 64. The CPU 63 calculates an engine rotation speed from the output pulse of the crank angle sensor 78.

Meanwhile, the output port 65 is connected to the ignition plug 21, the fuel injection valve 31, and the throttle valve drive actuator 47 via corresponding drive circuits 68. Therefore, the ECU 61 functions as a control device that controls a timing of ignition by the ignition plug 21, a fuel injection timing or an amount of fuel injected from the fuel injection valve 31, the opening degree of the throttle valve 45, and the like.

Split Injection

The control device 60 of the internal combustion engine 1 according to the present embodiment can cause the fuel injection valve 31 to execute a split injection in which a plurality of fuel injections into each cylinder 11 is executed in one cycle. Hereinafter, the split injection will be briefly described with reference to FIG. 2A to FIG. 2C.

Figure 2A:
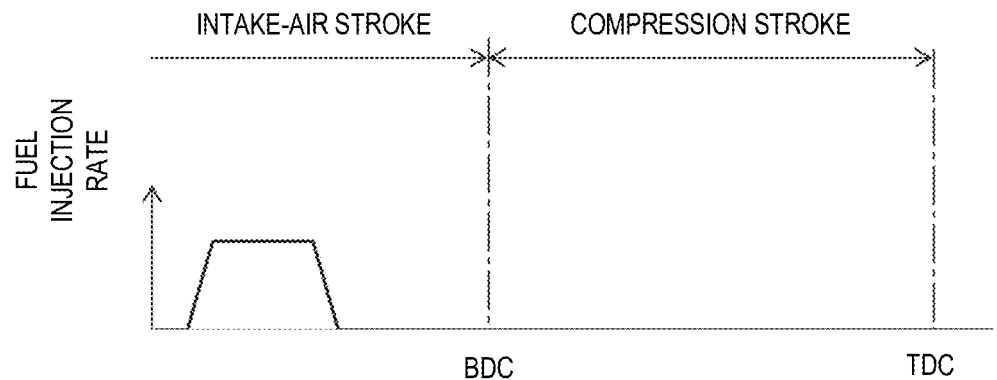
FIG. 2A is a diagram illustrating a transition of a rate of injection from a fuel injection valve from intake-air stroke to compression stroke in one cylinder.
Figure 2B:
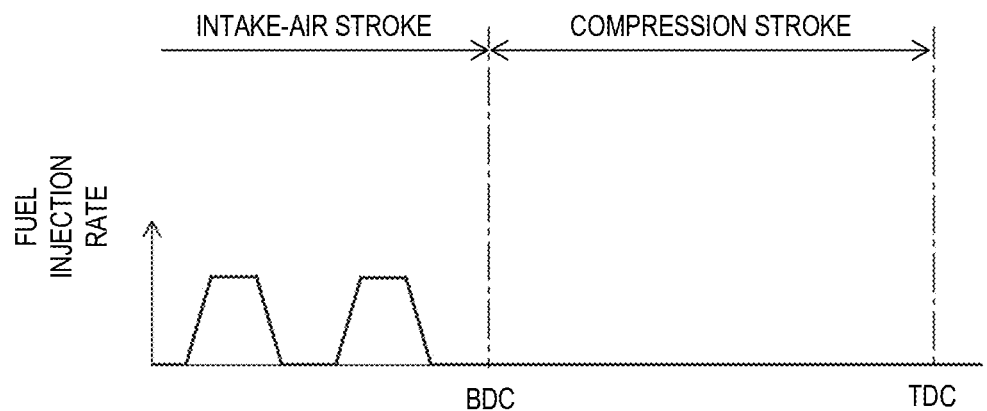
FIG. 2B is another diagram illustrating the transition of the rate of injection from the fuel injection valve from the intake-air stroke to the compression stroke in one cylinder.
Figure 2C:
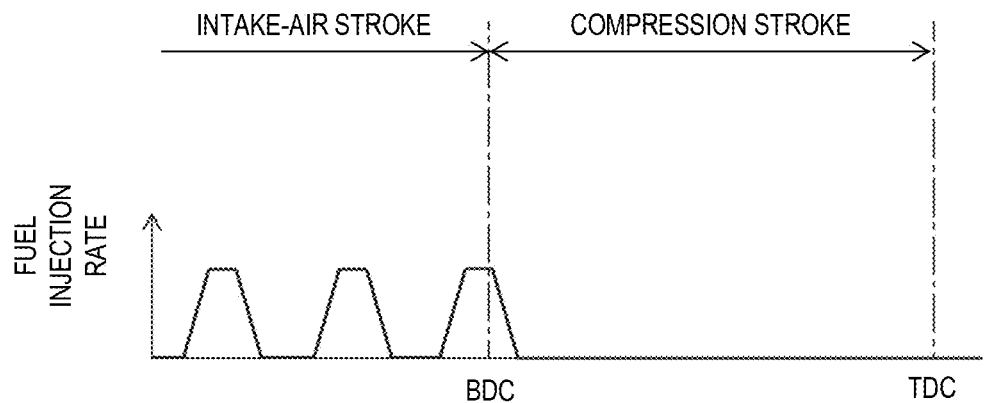
FIG. 2C is still another diagram illustrating the transition of the rate of injection from the fuel injection valve from the intake-air stroke to the compression stroke in one cylinder.

FIG. 2A to FIG. 2C illustrate transitions of rates of injection from the fuel injection valve 31 from intake-air stroke to compression stroke in one cylinder 11, respectively. FIG. 2A illustrates a transition in a case where only one fuel injection into each cylinder 11 is executed in one cycle without the execution of the split injection. FIG. 2B illustrates a transition in a case where two fuel injections into each cylinder 11 are executed in one cycle by the execution of the split injection. FIG. 2C illustrates a transition in a case where three fuel injections into each cylinder 11 are executed in one cycle by the execution of the split injection. In the examples illustrated in FIG. 2A to FIG. 2C, total fuel injection amounts per cycle are equal.

As illustrated in FIG. 2A, when only one fuel injection is executed, a time period during which a fuel injection rate is maximized is long. Since a large amount of fuel is injected from the fuel injection valve 31 at a high pressure when the fuel injection rate is high, the fuel that cannot be vaporized easily adheres to a wall surface of the cylinder 11. In particular, since a wall surface temperature of the cylinder 11 is low when the internal combustion engine 1 is cold-started, the fuel is easily liquefied near the wall surface of the cylinder 11, and it is difficult to vaporize the fuel adhering to the wall surface thereafter. As a result, when only one fuel injection is executed when the internal combustion engine 1 is cold-started, a part of the fuel adheres to the wall surface of the cylinder 11 and thus the vaporized fuel amount with respect to the injected fuel amount is decreased.

On the other hand, as illustrated in FIG. 2B or FIG. 2C, when a plurality of fuel injections is executed, the time period during which the fuel injection rate is high is shortened, and accordingly the amount of fuel adhering to the wall surface of the cylinder 11 is decreased. Therefore, the decrease in the vaporized fuel amount due to the adhesion of the fuel to the wall surface is restricted. This tendency is basically increased as the number of injections is increased. Therefore, as illustrated in FIG. 2C, when three fuel injections are executed, the amount of fuel adhering to the wall surface of the cylinder 11 can be further decreased, and accordingly the decrease in the vaporized fuel amount can be further restricted. For this reason, when the internal combustion engine 1 is cold-started, the split injection in which as many injections as possible are executed may be executed.

Ignition Retardation

When the internal combustion engine 1 is cold-started, temperatures of not only the engine body 10 but also the exhaust gas control catalyst 53 are low. When the temperature of the exhaust gas control catalyst 53 becomes equal to or higher than the active temperature of a noble metal catalyst of the exhaust gas control catalyst 53, the harmful substances can be removed from the exhaust gas at a high removal rate. Therefore, from the viewpoint of removing the harmful substances from the exhaust gas, when the internal combustion engine 1 is cold-started, it is necessary to raise the temperature of the exhaust gas control catalyst 53 to the active temperature as quickly as possible.

The ignition timing by the ignition plug 21 is basically set to a minimum advance for the best torque (MBT). By igniting the air-fuel mixture at the MBT, combustion efficiency is maximized, and accordingly the output torque and fuel efficiency can be improved. On the other hand, when the ignition timing is more retarded than the MBT, a combustion timing of the air-fuel mixture is delayed, and the proportion of thermal energy that remains without being converted into kinetic energy in the thermal energy obtained by combustion is increased. As a result, when the ignition timing is retarded, a temperature of the exhaust gas discharged from the engine body 10 rises. When the temperature of the exhaust gas rises in this manner, the temperature of the exhaust gas control catalyst 53 can be raised at an early stage by the heat of the exhaust gas. Therefore, when the internal combustion engine 1 is cold-started, the ignition timing by the ignition plug 21 may be set to a timing on the side that is more retarded than the MBT.

Start-Up Control

Figure 3:
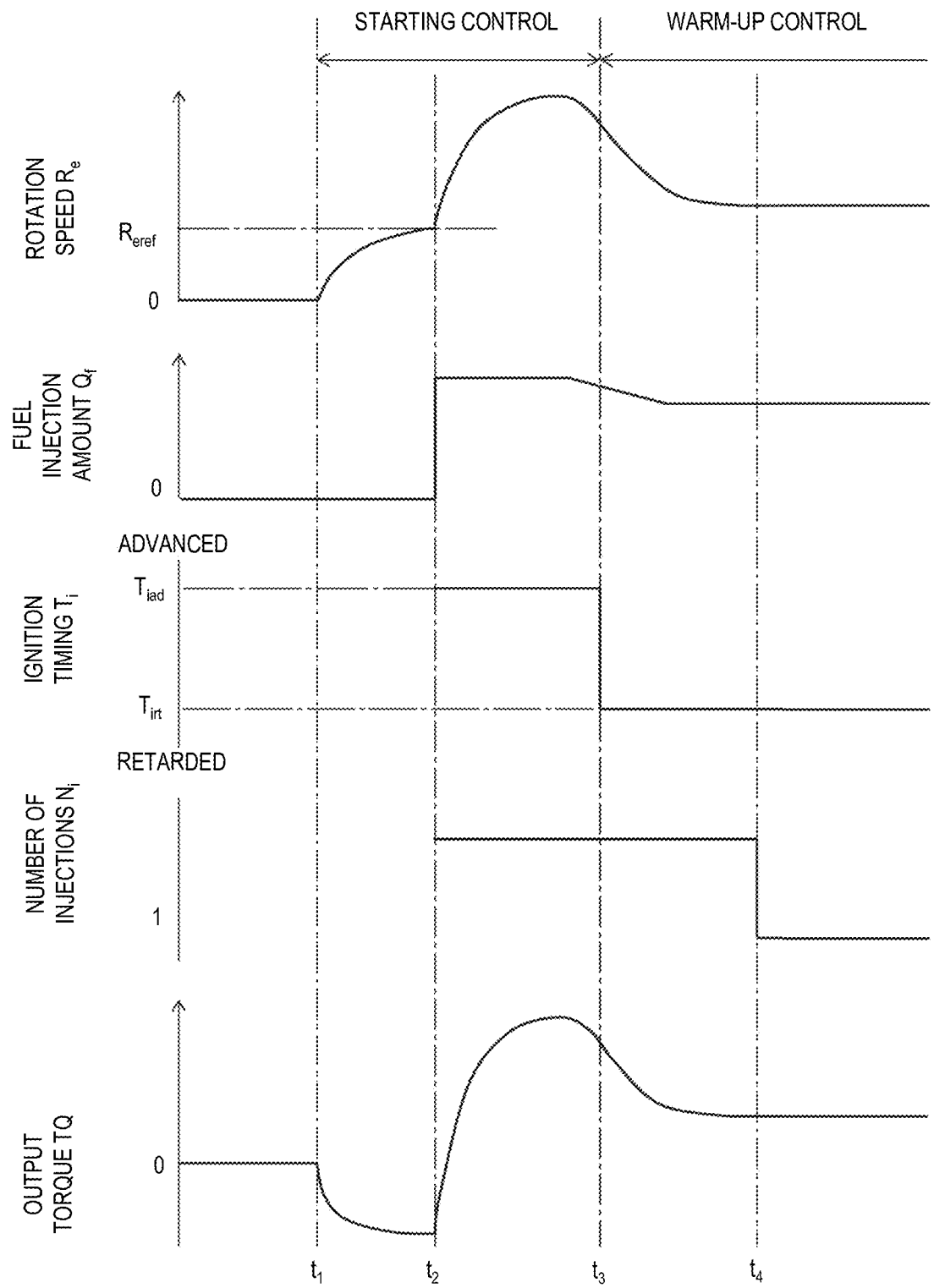
FIG. 3 is a time chart of various parameters when the internal combustion engine is cold-started.

A start-up control executed by the control device 60 according to the present embodiment will be described with reference to FIG. 3. FIG. 3 is a time chart of various parameters when the internal combustion engine 1 is cold-started. In particular, FIG. 3 is a time chart illustrating a rotation speed (the engine rotation speed) $R_e$ of the internal combustion engine 1, a fuel injection amount $Q_f$ to each cylinder 11 per cycle, an ignition timing $T_i$ by the ignition plug 21, the number of fuel injections $N_i$ into each cylinder 11 per cycle, and output torque TQ of the internal combustion engine 1. A value of the output torque TQ of the internal combustion engine 1 is negative when the internal combustion engine 1 is being driven by the starter motor 22.

In an example illustrated in FIG. 3, the internal combustion engine 1 is stopped until time $t_1$, and accordingly values of the engine rotation speed $R_e$, the fuel injection amount $Q_f$, and the output torque TQ are all zero. At time $t_1$, a starting control for starting the stopped internal combustion engine 1 is started. The starting control is executed for changing the internal combustion engine 1 from a state where the crankshaft is stopped to a state where rotation can be maintained by combustion of the air-fuel mixture.

At time $t_1$, when the starting control is started, first, the internal combustion engine 1 is driven by the starter motor 22. As a result, the engine rotation speed $R_e$ is increased, and, since the torque is transmitted from the starter motor 22 to the internal combustion engine 1, the value of the output torque TQ becomes negative. In the present embodiment, immediately after the starting control is started, neither the fuel injection from the fuel injection valve 31 nor the ignition by the ignition plug 21 is executed.

In the present embodiment, thereafter, at time $t_2$, when the engine rotation speed $R_e$ reaches a predetermined reference rotation speed $R_{eref}$, the fuel injection from the fuel injection valve 31 is started, and the ignition by the ignition plug 21 of the air-fuel mixture formed by the fuel injection is started. In the present embodiment, the fuel injection and the ignition are started when the engine rotation speed $R_e$ reaches the reference rotation speed $R_{eref}$, but the fuel injection and the ignition may be started at a different timing. For example, the fuel injection and the ignition may be started at the same time as when the driving by the starter motor 22 is started, or at the time after the crankshaft is rotated by the starter motor 22 only by a predetermined rotation amount.

In the present embodiment, during the starting control, the number of fuel injections $N_i$ from the fuel injection valve 31 into each cylinder 11 per cycle is set to the maximum number of injections. Therefore, in the present embodiment, when the cold-starting of the internal combustion engine 1 is started, the split injection control for executing a plurality of fuel injections into each cylinder 11 is executed in one cycle. In particular, in the present embodiment, in each fuel injection, the fuel of a fuel injection amount obtained by evenly splitting a total injection amount per cycle by the maximum number of injections is injected. Here, the maximum number of injections is set such that when the number of fuel injections becomes greater than the maximum number of injections, an amount of one fuel injection is decreased too much and cannot be accurately controlled. Therefore, during the starting control, the fuel injected from the fuel injection valve 31 is restricted from adhering to the wall surface of each cylinder 11, such that atomization of the fuel is promoted.

Further, in the present embodiment, during the starting control, the ignition timing $T_i$ by the ignition plug 21 is set to a predetermined timing on the relatively advanced side (for example, a timing near the MBT, hereinafter referred to as an "advanced-side timing $T_{iad}$"). Therefore, the air-fuel mixture in the combustion chamber 15 can be combusted in a relatively stable state.

After time $t_2$, by executing the fuel injection from the fuel injection valve 31 and the ignition by the ignition plug 21, the air-fuel mixture is combusted in the combustion chamber 15, such that torque is generated by the internal combustion engine 1. For this reason, after time $t_2$, the output torque TQ is increased and accordingly the engine rotation speed $R_e$ is increased. Thereafter, when the output torque TQ becomes equal to or greater than a predetermined torque which has a value equal to or greater than zero, the starter motor 22 is stopped, and when the engine rotation speed $R_e$ reaches a predetermined rotation speed equal to or greater than an idling rotation speed, the fuel injection amount $Q_f$ is decreased. In this manner, when the engine rotation speed $R_e$ reaches the predetermined rotation speed equal to or greater than the idling rotation speed, the internal combustion engine 1 is in a state where the rotation can be maintained by the combustion of the air-fuel mixture.

In the present embodiment, at time $t_3$ when any number of cycles (for example, 2 or 3 cycles) has been completed since the fuel injection and the ignition were started, the starting control is ended and a warm-up control is started. As illustrated in FIG. 3, time $t_3$ is a time after the engine rotation speed $R_e$ reaches a predetermined rotation speed equal to or greater than the idling rotation speed and at time $t_3$, the engine rotation speed $R_e$ starts to be decreased. In the present embodiment, an end timing of the starting control is set based on the number of cycles after the start of the fuel injection and the ignition. Alternatively, the end timing of the starting control may be set in any manner as long as the end timing is a timing after the engine rotation speed $R_e$ reaches the predetermined rotation speed equal to or greater than the idling rotation speed. Therefore, for example, the starting control may be ended when the engine rotation speed $R_e$ detected by using the crank angle sensor 78 reaches the predetermined rotation speed.

The warm-up control is executed for raising the temperatures of the engine body 10 and the exhaust gas control catalyst 53 at an early stage. Therefore, at time $t_3$ when the warm-up control is started, the ignition timing $T_i$ by the ignition plug 21 is changed from the advanced-side timing $T_{iad}$ to a predetermined timing on the relatively retarded side (hereinafter referred to as a "retarded-side timing $T_{irt}$"). Therefore, in the present embodiment, the ignition timing $T_i$ by the ignition plug 21 is retarded after the start-up of the internal combustion engine 1 is started. Here, the retarded-side timing $T_{irt}$ is set to a timing on the retarded side as far as possible within a range in which combustion can be maintained at, for example, 15° ATDC. As a result, after time $t_3$, the temperature of the exhaust gas rises and accordingly the temperature of the exhaust gas control catalyst 53 rises.

Further, in the present embodiment, at time $t_4$ when any number of cycles (for example, 2 or 3 cycles) has been completed since the warm-up control was started, that is, since the ignition timing $T_i$ by the ignition plug 21 was retarded, the number of fuel injections $N_i$ from the fuel injection valve 31 is decreased from the maximum number of injections to the minimum number of injections (for example, one injection). In other words, in the present embodiment, the number of fuel injections $N_i$ is decreased after the ignition timing $T_i$ is retarded. In particular, the number of fuel injections $N_i$ is decreased after the retardation of the ignition timing $T_i$ is completed.

Thereafter, the warm-up control is ended when, for example, the temperature of the exhaust gas control catalyst 53 rises to the active temperature. When the warm-up control is ended, the start-up control of the internal combustion engine 1 is ended, and a normal control is started. In the normal control, the ignition timing $T_i$ and the number of fuel injections $N_i$ from the fuel injection valve 31 are set based on the engine rotation speed $R_e$ and the engine load. In particular, the ignition timing $T_i$ is basically set to a timing on a relatively advanced-side near the MBT.

Flow of Start-Up Control

Figure 4:
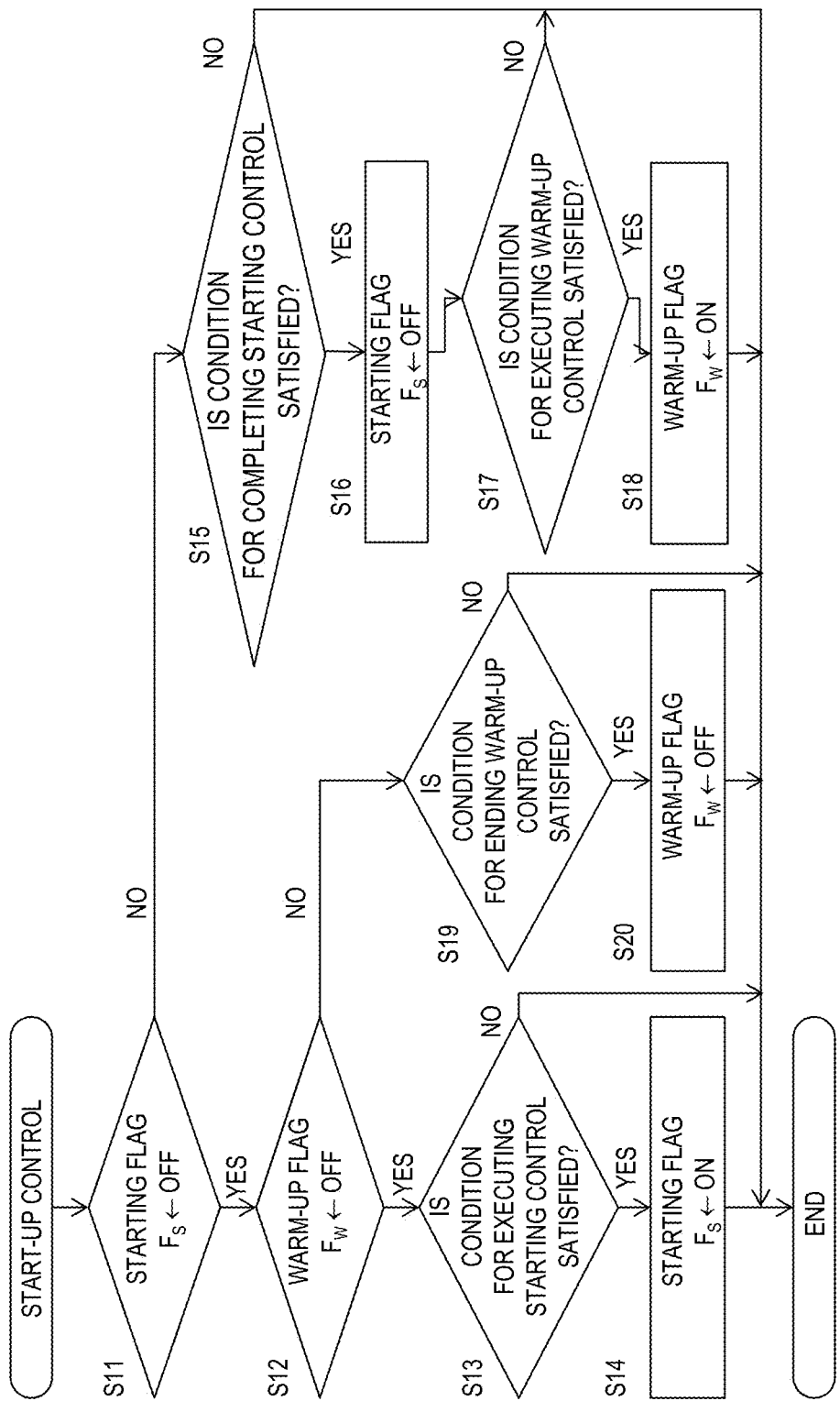
FIG. 4 is a flowchart illustrating a control routine for determining a control to be executed in a start-up control.

Next, a flow of the start-up control executed by the control device 60 according to the present embodiment will be described with reference to FIGS. 4 to 6. FIG. 4 is a flowchart illustrating a control routine for determining a control to be executed in the start-up control. The ECU 61 executes the illustrated control routine at regular time intervals.

With reference to FIG. 4, first, in step S11, the ECU 61 determines whether a starting flag $F_s$ is set to OFF. The starting flag $F_s$ is set to ON when the starting control is being executed and is set to OFF at other times. In step S11, when the ECU 61 determines that the starting flag $F_s$ is set to OFF, the control routine proceeds to step S12.

In step S12, the ECU 61 determines whether a warm-up flag $F_w$ is set to OFF. The warm-up flag $F_w$ is set to ON during the execution of the warm-up control and is set to OFF at other times. In step S12, when the ECU 61 determines that the warm-up flag $F_w$ is set to OFF, the control routine proceeds to step S13.

In step S13, the ECU 61 determines whether a condition for starting is satisfied. The condition for starting is satisfied in a case where, for example, an ignition switch of a vehicle having the internal combustion engine 1 mounted thereon is turned on or in a case where the ECU 61 determines to automatically start up the internal combustion engine 1 because a battery needs to be charged. In step S13, when the ECU 61 determines that the condition for starting is not satisfied, the control routine is ended. On the other hand, in step S13, when the ECU 61 determines that the condition for starting is satisfied, the control routine proceeds to step S14, the starting flag $F_s$ is set to ON, and the starting control is started.

When the starting flag $F_s$ is set to ON and the starting control is started, the control routine proceeds from step S11 to step S15. In step S15, the ECU 61 determines whether a condition for completing the starting control is satisfied. The condition for completing the starting control is satisfied in a case where, for example, a predetermined number of cycles (for example, 2 or 3 cycles) has been completed since the ignition by the ignition plug 21 was started in the starting control or in a case where the engine rotation speed $R_e$ detected by the crank angle sensor 78 reaches the predetermined rotation speed. In step S15, when the ECU 61 determines that the condition for completing the starting control is not satisfied, the control routine is ended. On the other hand, when the ECU 61 determines that the condition for completing the starting control is satisfied, the control routine proceeds to step S16. In step S16, the starting flag $F_s$ is set to OFF, and the starting control is ended.

Next, in step S17, the ECU 61 determines whether a condition for executing the warm-up is satisfied. The condition for executing the warm-up is satisfied in a case where, for example, the temperature of the coolant of the internal combustion engine 1 detected by the coolant temperature sensor 75 is lower than a predetermined warm-up completion temperature, or in a case where the exhaust gas control catalyst 53 detected by the catalyst temperature sensor 73 is lower than the active temperature. In other words, the condition for executing the warm-up is satisfied in a case where the internal combustion engine 1 is started up (cold-started) in a state where the temperature of the coolant or the exhaust gas control catalyst 53 is low. In step S17, when the ECU 61 determines that the condition for executing the warm-up is not satisfied, the control routine is ended. In this case, the normal control is started without the execution of the warm-up control. On the other hand, in step S17, when the ECU 61 determines that the condition for executing the warm-up is satisfied, the control routine proceeds to step S18, the warm-up flag $F_w$ is set to ON, and the warm-up control is started.

When the warm-up flag $F_w$ is set to ON and the warm-up control is started, the control routine proceeds from step S12 to step S19. In step S19, the ECU 61 determines whether a condition for ending the warm-up control is satisfied. The condition for ending the warm-up control is satisfied in a case where, for example, the temperature of the coolant of the internal combustion engine 1 detected by the coolant temperature sensor 75 is equal to or higher than the predetermined warm-up completion temperature, or in a case where the exhaust gas control catalyst 53 detected by the catalyst temperature sensor 73 is equal to or higher than the active temperature. In step S19, when the ECU 61 determines that the condition for ending the warm-up control is not satisfied, the control routine is ended. On the other hand, in step S19, when the ECU 61 determines that the condition for ending the warm-up control is satisfied, the control routine proceeds to step S20. In step S20, the warm-up flag $F_w$ is set to OFF, the warm-up control is ended, and the normal control is started.

Figure 5:
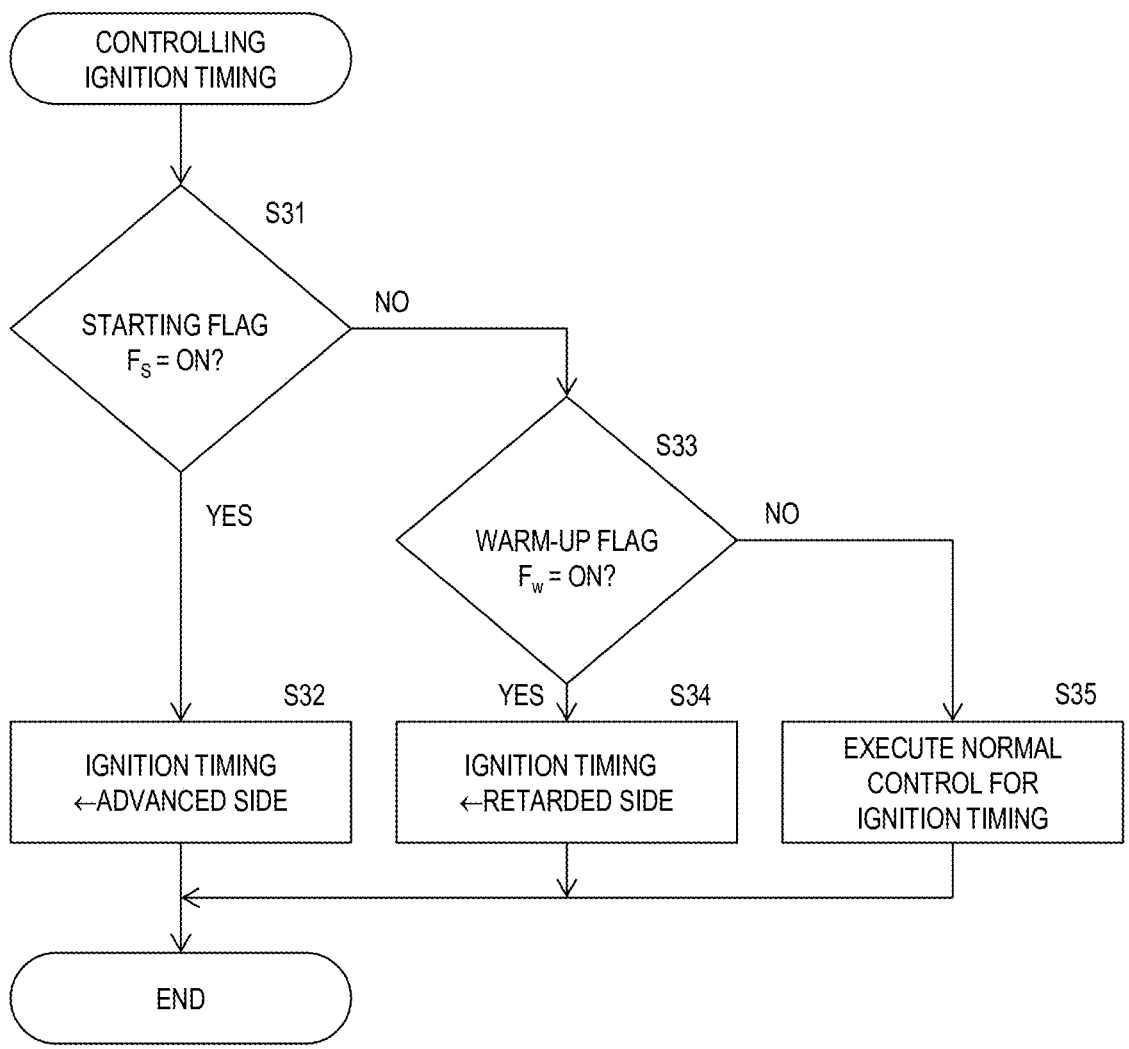
FIG. 5 is a flowchart illustrating a control routine for controlling an ignition timing by an ignition plug.

FIG. 5 is a flowchart illustrating a control routine for controlling the ignition timing $T_i$ by the ignition plug 21. The ECU 61 executes the illustrated control routine at regular time intervals.

As illustrated in FIG. 5, first, in step S31, the ECU 61 determines whether the starting flag $F_s$ is set to ON, that is, whether the starting control is being executed. When the starting flag $F_s$ is set to ON, the control routine proceeds to step S32. In step S32, the ignition timing $T_i$ is set to the advanced-side timing $T_{iad}$. On the other hand, in step S31, when the ECU 61 determines that the starting flag $F_s$ is set to OFF, the control routine proceeds to step S33.

In step S33, the ECU 61 determines whether the warm-up flag $F_w$ is set to ON, that is, whether the warm-up control is being executed. When the ECU 61 determines that the warm-up flag $F_w$ is set to ON, the control routine proceeds to step S34.

In step S34, the ignition timing $T_i$ is set to the retarded-side timing $T_{irt}$. On the other hand, in step S33, when the ECU 61 determines that the warm-up flag $F_w$ is set to OFF, the control routine proceeds to step S35. In step S35, the normal control is executed and the ignition timing $T_i$ is set based on the engine rotation speed $R_e$, which is calculated based on the output of the crank angle sensor 78, and the engine load, which is detected by the load sensor 77.

Figure 6:
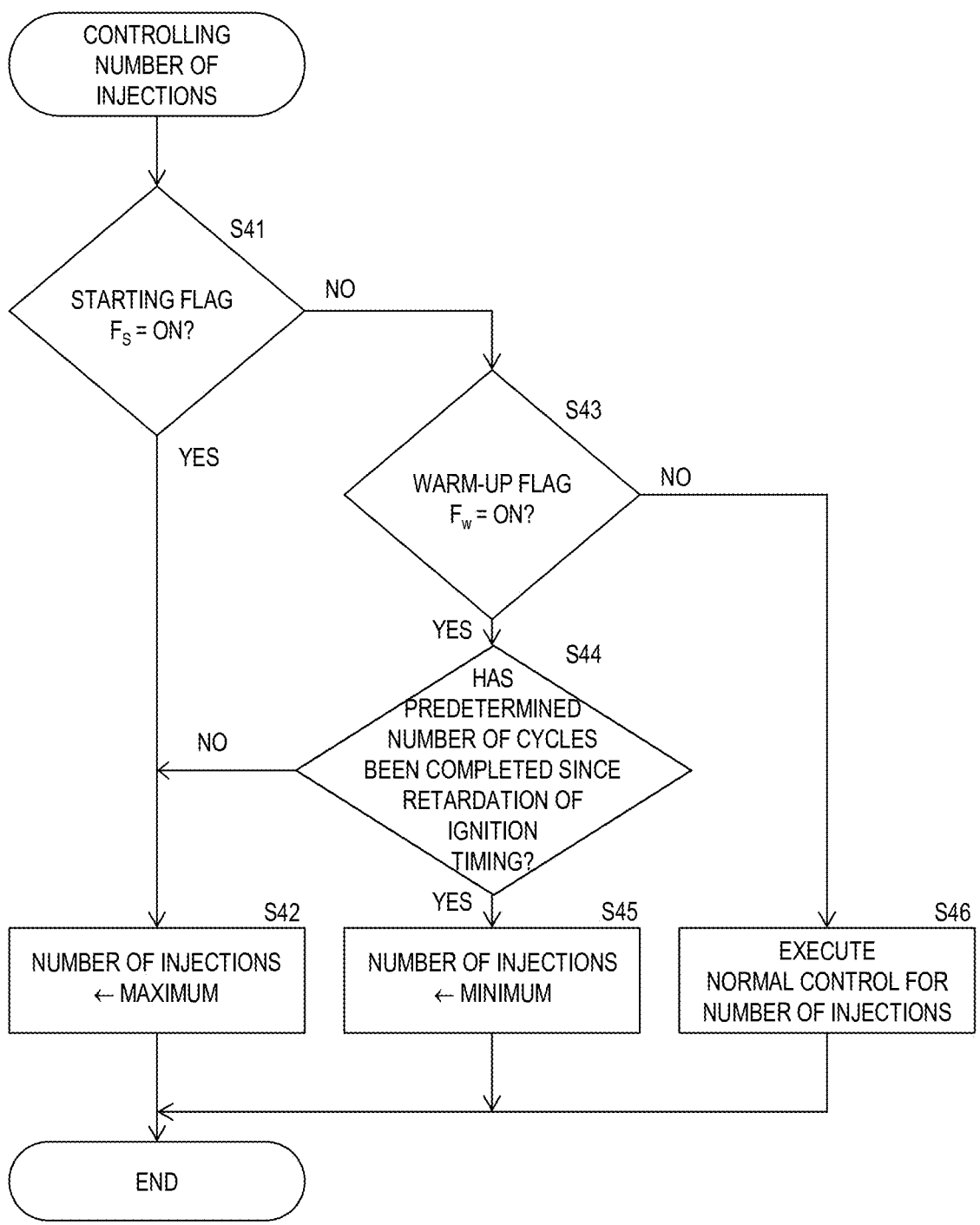
FIG. 6 is a flowchart illustrating a control routine for controlling the number of fuel injections from the fuel injection valve.

FIG. 6 is a flowchart illustrating a control routine for controlling the number of fuel injections $N_i$ from the fuel injection valve 31. The ECU 61 executes the illustrated control routine at regular time intervals.

As illustrated in FIG. 6, first, in step S41, the ECU 61 determines whether the starting flag $F_s$ is set to ON. When the starting flag $F_s$ is set to ON, the control routine proceeds to step S42. In step S42, the number of fuel injections $N_i$ into each cylinder 11 per cycle is set to the maximum number of injections. On the other hand, in step S41, when the ECU 61 determines that the starting flag $F_s$ is set to OFF, the control routine proceeds to step S43.

In step S43, the ECU 61 determines whether the warm-up flag $F_w$ is set to ON. When the ECU 61 determines that the warm-up flag $F_w$ is set to ON, the control routine proceeds to step S44. In step S44, the ECU 61 determines whether a predetermined number of cycles (for example, 2 or 3 cycles) has been completed since the ignition timing $T_i$ was set to the retarded-side timing $T_{irt}$ by step S34 in FIG. 5. Alternatively, in step S44, the ECU 61 may determine whether a predetermined time period has passed since the ignition timing $T_i$ was set to the retarded-side timing $T_{irt}$. In step S44, when the ECU 61 determines that the predetermined number of cycles has not been completed since the ignition timing $T_i$ was set to the retarded-side timing $T_{irt}$, the control routine proceeds to step S42, and the number of fuel injections $N_i$ into each cylinder 11 per cycle is maintained at the maximum number of injections. On the other hand, in step S44, when the ECU 61 determines that the predetermined number of cycles has been completed since the ignition timing $T_i$ was set to the retarded-side timing $T_{irt}$, the control routine proceeds to step S45. In step S45, the number of fuel injections $N_i$ into each cylinder 11 per cycle is set to the minimum number of injections.

On the other hand, in step S43, when the ECU 61 determines that the warm-up flag $F_w$ is set to OFF, the control routine proceeds to step S46. In step S46, the normal control is executed and the number of fuel injections $N_i$ into each cylinder 11 per cycle is set based on the engine rotation speed $R_e$, which is calculated based on the output of the crank angle sensor 78, and the engine load, which is detected by the load sensor 77.

Advantageous Effect and Modified Examples

In the above embodiment, when the internal combustion engine 1 is cold-started, first, in the starting control, the ignition timing $T_i$ by the ignition plug 21 is set to the timing on the relatively advanced-side and a plurality of fuel injections into each cylinder 11 is executed in one cycle. Thereafter, according to the start of the warm-up control, the ignition timing $T_i$ is retarded, and the number of fuel injections $N_i$ into each cylinder 11 per cycle is decreased according to the retardation of the ignition timing $T_i$.

Here, as described above, when the cold-starting of the internal combustion engine 1 is started, the number of fuel injections into the cylinder 11 per cycle may be increased in order to restrict a decrease in the vaporized fuel amount due to adhesion of the injected fuel to the wall surface of the cylinder 11. However, when the number of injections is increased in this manner, as can be seen from FIG. 2A to FIG. 2C, the timing of a completion of a final fuel injection is retarded. As a result, the fuel injected at the retarded timing is not sufficiently mixed in the combustion chamber 15 by the ignition timing $T_i$. For this reason, at the ignition timing $T_i$ by the ignition plug 21, the homogeneity of the air-fuel mixture is low.

In this manner, when the ignition timing $T_i$ is retarded in the state where the homogeneity of the air-fuel mixture is low, the combustion of the air-fuel mixture deteriorates. In response, in the present embodiment, when the homogeneity of the air-fuel mixture is low immediately after the start-up of the internal combustion engine 1, the ignition timing $T_i$ is set to a timing on the advanced-side. Therefore, deterioration of combustion of the air-fuel mixture can be restricted.

Further, in the present embodiment, when the starting of the internal combustion engine 1 is completed and the warm-up control is started, the ignition timing $T_i$ is retarded and accordingly the number of fuel injections $N_i$ into each cylinder 11 per cycle is decreased. When the number of fuel injections $N_i$ is decreased, the injected fuel easily adheres to the wall surface of the cylinder 11, but since the fuel injection is completed at an early stage, the homogeneity of the vaporized fuel without adhering to the wall surface is high. In this manner, since the homogeneity of the air-fuel mixture is high, even when the ignition timing $T_i$ is retarded, the combustion of the air-fuel mixture does not deteriorate and accordingly appropriate combustion can be maintained. Therefore, with the present embodiment, when the internal combustion engine 1 is cold-started, deterioration of stability of combustion of an air-fuel mixture can be restricted even when the split injection and retardation of the ignition timing $T_i$ are executed. As a result, with the present embodiment, an increase in vibration or noise in the internal combustion engine 1 can be restricted.

However, when the number of fuel injections $N_i$ is decreased, the amount of fuel adhering to the wall surface of the cylinder 11 is increased, and accordingly the overall fuel concentration of the air-fuel mixture becomes low and combustion becomes difficult. Meanwhile, when the ignition timing $T_i$ is retarded, the combustion state of the air-fuel mixture is significantly changed, and accordingly the combustion becomes unstable. Therefore, when the decrease in the number of fuel injections $N_i$ and the retardation of the ignition timing $T_i$ are executed at the same time, a possibility of misfire is increased. In the present embodiment, the decrease in the number of fuel injections $N_i$ into each cylinder 11 is executed per cycle at a different timing from the retardation of the ignition timing $T_i$ by the ignition plug 21. For this reason, when a transition from the starting control to the warm-up control is executed, a possibility of misfire can be reduced. In particular, in the present embodiment, the number of fuel injections $N_i$ into each cylinder 11 is decreased after the ignition timing $T_i$ by the ignition plug 21 is retarded. Therefore, during a time period from after the retardation of the ignition timing $T_i$ until the decrease in the number of fuel injections $N_i$, the combustion state of the air-fuel mixture becomes temporarily unstable and a torque fluctuation easily occurs, but a possibility of misfire due to a low overall fuel concentration of the air-fuel mixture can be reduced. Further, since a time immediately after the starting control is completed is a time immediately after a large torque fluctuation occurs with the starting of the internal combustion engine 1, even when the torque fluctuation due to the temporary instability of the combustion state occurs at this time, it is difficult for an occupant to sense it.

Further, in the above embodiment, the number of fuel injections $N_i$ into each cylinder 11 per cycle during the starting control is set to the maximum number of injections. However, the number of fuel injections $N_i$ during the starting control may be less than the maximum number of injections. However, in this case as well, the number of fuel injections $N_i$ during the starting control is set to be greater than the number of fuel injections $N_i$ during the warm-up control.

In addition, in the above embodiment, the ignition timing $T_i$ by the ignition plug 21 during the warm-up control is set to a timing on the retarded side as far as possible within a range in which combustion can be maintained, but the ignition timing $T_i$ during the warm-up control may be set to a timing closer to the advanced-side than the above timing is. However, even in this case, the ignition timing $T_i$ during the warm-up control is set to a timing closer to the retarded side than the ignition timing $T_i$ during the starting control is.

Second Embodiment

Next, with reference to FIG. 7, the control device according to a second embodiment will be described. Hereinbelow, differences from the control of the control device in the first embodiment will be mainly described.

In the first embodiment, at the same time as the start of the warm-up control, the ignition timings $T_i$ are changed from the advanced-side timing $T_{iad}$ to the retarded-side timing $T_{irt}$ all at once. However, in the present embodiment, when the warm-up control is started, the ignition timings $T_i$ are changed from the advanced-side timing $T_{iad}$ to the retarded-side timing $T_{irt}$ in a step-by-step manner.

Figure 7:
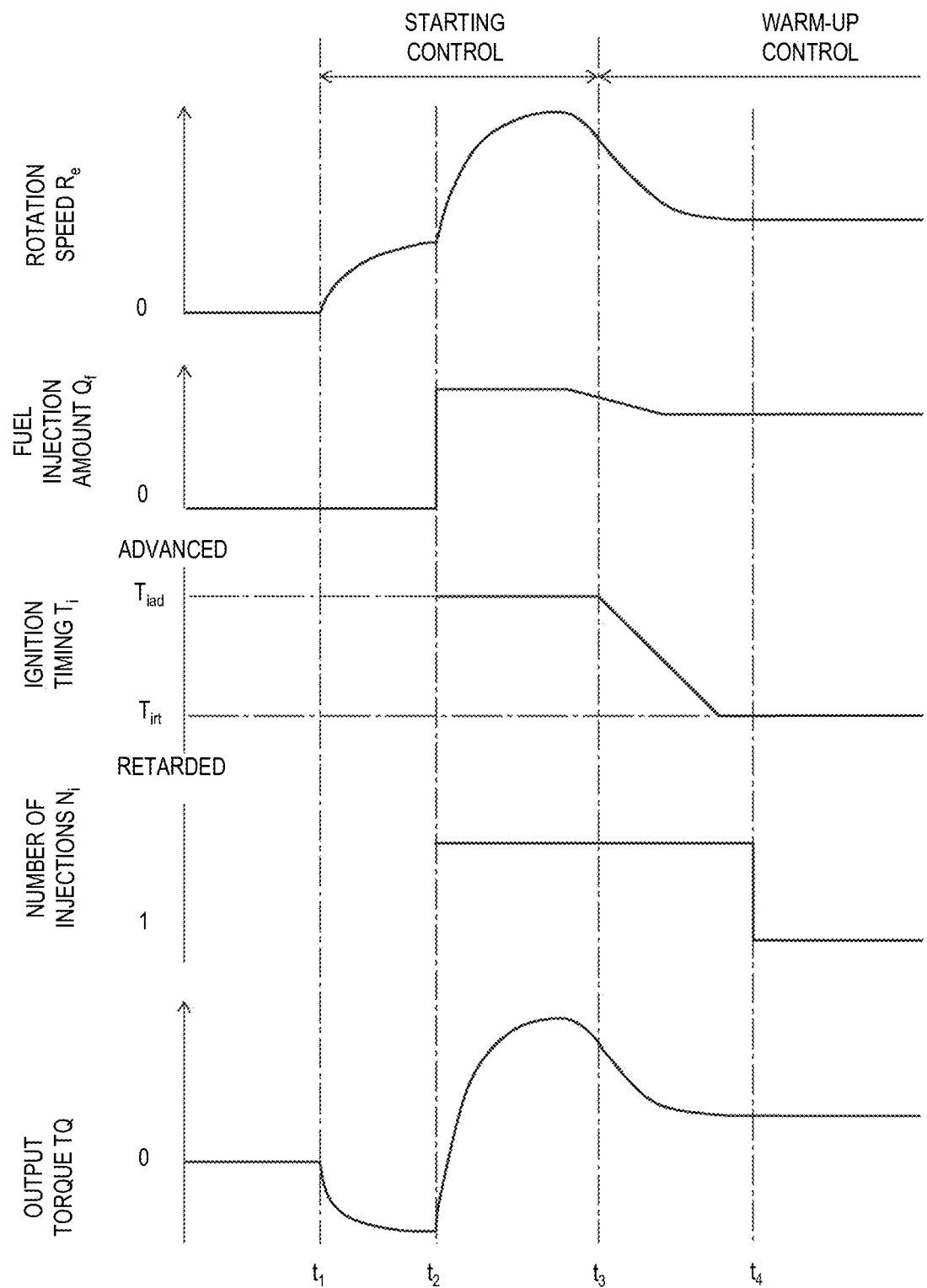
FIG. 7 is a time chart of various parameters when the internal combustion engine is cold-started, similar to FIG. 3.

FIG. 7 is a time chart of various parameters when the internal combustion engine 1 is cold-started, similar to FIG. 3. As illustrated in FIG. 7, in the present embodiment, when the starting control is completed and the warm-up control is started at time $t_3$, the ignition timings $T_i$ by the ignition plug 21 are retarded in the step-by-step manner. In the present embodiment, the ignition timings $T_i$ are gradually retarded according to the order of the cylinders 11 in which combustion is executed even during one cycle. Alternatively, the ignition timings $T_i$ may be gradually retarded in each cycle. In this case, all cylinders 11 are ignited at the same ignition timing $T_i$ during the same cycle.

Thereafter, in the present embodiment, after the ignition timing $T_i$ reaches the retarded-side timing $T_{irt}$ which has been set during the warm-up control, the number of fuel injections $N_i$ from the fuel injection valve 31 is decreased from the maximum number of injections to the minimum number of injections at time $t_4$. Therefore, in the present embodiment as well, the number of fuel injections $N_i$ is decreased after the retardation of the ignition timings $T_i$ for the warm-up control is all completed.

With the present embodiment, since the ignition timings $T_i$ are retarded in the step-by-step manner, even when the ignition timings $T_i$ are greatly retarded, the combustion state is restricted from becoming too unstable, and accordingly, too large a torque fluctuation can be restricted from occurring.

Third Embodiment

Next, with reference to FIG. 8, the control device according to a third embodiment will be described. Hereinbelow, differences from the controls of the control device in the first and the second embodiments will be mainly described.

In the first and the second embodiments, the number of fuel injections $N_i$ into each cylinder 11 per cycle is changed from the maximum number of injections to the minimum number of injections at once. However, in the present embodiment, the number of fuel injections $N_i$ into each cylinder 11 per cycle is changed from the maximum number of injections to the minimum number of injections in the step-by-step manner.

Figure 8:
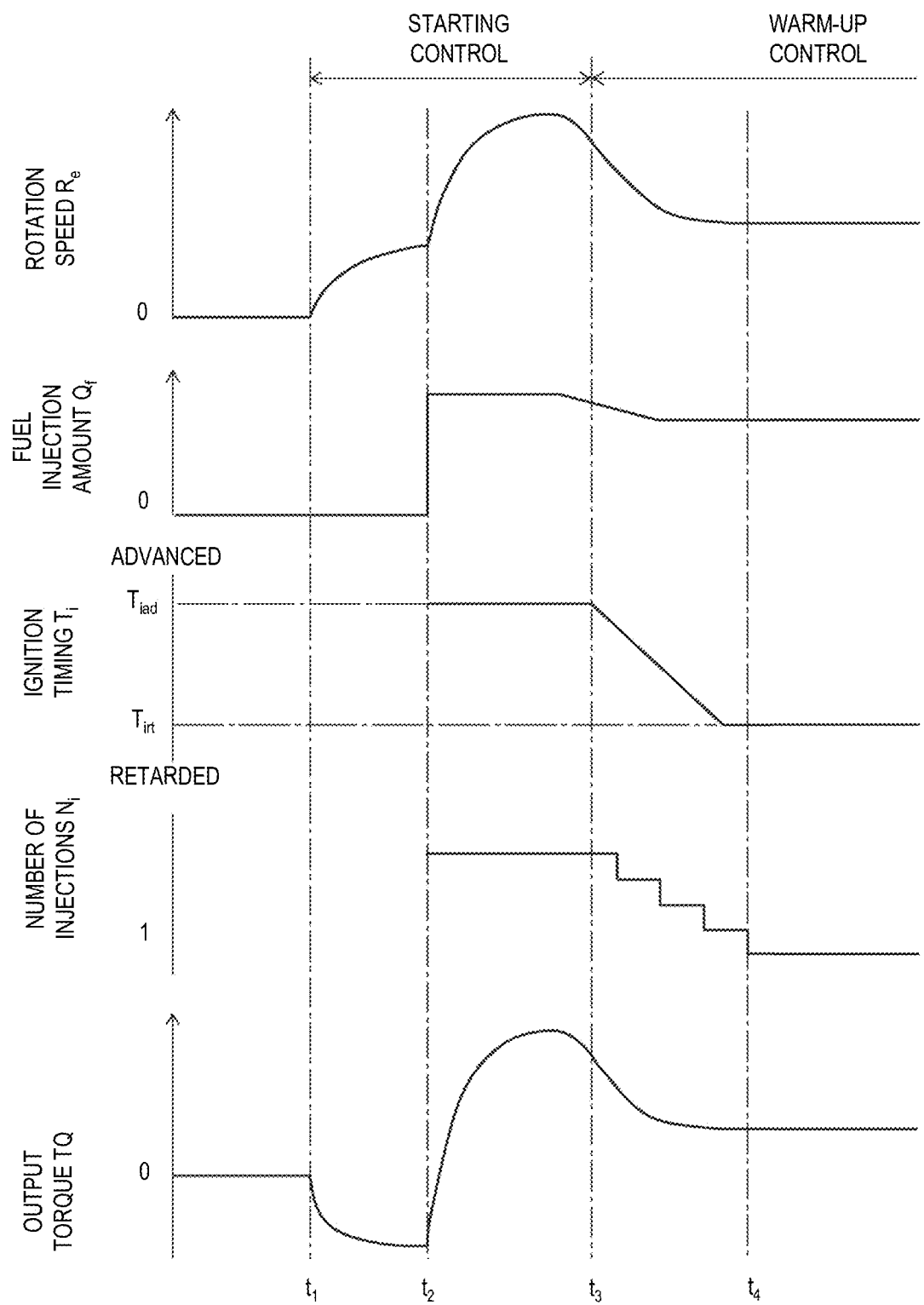
FIG. 8 is a time chart of various parameters when the internal combustion engine is cold-started, similar to FIGS. 3 and 7.

FIG. 8 is a time chart of various parameters when the internal combustion engine 1 is cold-started, similar to FIGS. 3 and 7. As illustrated in FIG. 8, in the present embodiment, when the starting control is completed and the warm-up control is started at time $t_3$, the ignition timings $T_i$ by the ignition plug 21 are retarded in the step-by-step manner, similar to the second embodiment. In particular, in the present embodiment, the ignition timings $T_i$ are retarded by a predetermined angle in each ignition or in each cycle.

Thereafter, in the present embodiment, each time the ignition timings $T_i$ are retarded by a certain angle, the number of fuel injections $N_i$ into each cylinder 11 per cycle is decreased by one fuel injection. In other words, in the present embodiment, after the ignition timings $T_i$ are retarded by the certain angle, the number of fuel injections $N_i$ is decreased corresponding to the retarded angle. In particular, in the present embodiment, the certain angle is sufficiently larger than an angle by which the ignition timing $T_i$ is retarded per one time. Therefore, each time a plurality of ignition timings $T_i$ is retarded, the number of fuel injections $N_i$ into each cylinder 11 per cycle is decreased by one fuel injection.

In the example illustrated in FIG. 8, during the starting control, the number of fuel injections $N_i$ into each cylinder 11 executed per cycle is five. After the ignition timings $T_i$ are retarded by the certain angle, the number of fuel injections $N_i$ is decreased to four. After the ignition timings $T_i$ are retarded by the certain angle again, the number of fuel injections $N_i$ is decreased to three. By repeating the above operation, the number of fuel injections $N_i$ is decreased in the step-by-step manner according to the retardation of the ignition timings $T_i$ in the step-by-step manner, and is finally decreased to one. As can be seen from FIG. 8, the decrease in the number of fuel injections $N_i$ is started after the retardation of the ignition timings $T_i$ is started, and is ended after the retardation of the ignition timings $T_i$ is ended. Therefore, in the present embodiment, the number of fuel injections $N_i$ into each cylinder 11 per cycle is decreased in the step-by-step manner according to the retardation of the ignition timings $T_i$ in the step-by-step manner.

With the present embodiment, the ignition timings $T_i$ are retarded in the step-by-step manner, and accordingly the number of fuel injections $N_i$ is also decreased in the step-by-step manner. In the present embodiment as well, since the ignition timings $T_i$ are retarded in the step-by-step manner, even when the ignition timings $T_i$ are greatly retarded, too large a torque fluctuation can be restricted from occurring. In addition, in the present embodiment, the number of fuel injections $N_i$ is decreased in the step-by-step manner. Therefore, temporary deterioration of the combustion state due to the retardation of the ignition timings $T_i$ can be restricted to a minimum degree.

Although the embodiments of the present disclosure have been appropriately described above, an applicable embodiment of the present disclosure is not limited to the embodiments, and various modifications and changes can be made within the scope of the claims.

What is claimed is:

1. A control device of an internal combustion engine, the internal combustion engine including a fuel injection valve that injects fuel into a combustion chamber and an ignition plug that ignites an air-fuel mixture in the combustion chamber, the control device comprising:
an electronic control unit configured to:
when a cold-starting of the internal combustion engine is started, execute a plurality of fuel injections into each cylinder in one cycle;
after the cold-starting of the internal combustion engine is started, retard a timing of an ignition by the ignition plug in each cylinder; and
after the timing of the ignition by the ignition plug is retarded, decrease the number of fuel injections into each cylinder in one cycle.

2. The control device according to claim 1, wherein the electronic control unit is configured to retard the timing of the ignition in each cylinder in a step-by-step manner.

3. The control device according to claim 1, wherein the electronic control unit is configured to decrease the number of fuel injections into each cylinder in the one cycle after the retardation of the timing of the ignition in each cylinder is all completed.

4. The control device according to claim 2, wherein the electronic control unit is configured to decrease the number of fuel injections into each cylinder in the one cycle in a step-by-step manner in response to the retardation of the timing of the ignition in each cylinder in the step-by-step manner.

5. The control device according to claim 1, wherein the electronic control unit is configured to decrease the number of fuel injections into each cylinder in the one cycle in response to the retardation of the timing of the ignition in said each cylinder.

* * * * *